United States Patent [19]

Zimmerman

[11] Patent Number: 4,478,139
[45] Date of Patent: Oct. 23, 1984

[54] BEVERAGE MAKING MACHINE

[75] Inventor: John D. Zimmerman, Springfield, Ill.

[73] Assignee: Bunn-O-Matic Corporation, Springfield, Ill.

[21] Appl. No.: 462,139

[22] Filed: Jan. 31, 1983

[51] Int. Cl.³ ............................................. A47J 31/00
[52] U.S. Cl. ...................................... 99/280; 99/284; 99/307
[58] Field of Search ................ 99/280, 284, 295, 282, 99/300, 304, 307, 309, 283, 281; 926/433

[56] References Cited

U.S. PATENT DOCUMENTS

| | | | |
|---|---|---|---|
| 3,343,478 | 9/1967 | Hausam | 99/283 |
| 3,793,934 | 2/1974 | Martin | 99/282 |
| 3,858,569 | 1/1975 | Berger | 99/280 |
| 3,948,156 | 4/1976 | Smith | 99/280 |

Primary Examiner—Robert W. Jenkins
Attorney, Agent, or Firm—Lockwood, Dewey, Alex & Cummings

[57] ABSTRACT

A beverage making appliance operable either automatically or as a pour-in beverage maker. A cold water basin is located over a hot water tank. Cold water tube extends down into the hot water tank from a drain opening in the bottom of the basin whereby cold water discharges into the lower portion of the hot water tank and displaces an equal quantity of hot water through a siphon tube for discharge through a spray head onto the contents in a brew funnel positioned beneath the spray head. In the automatic mode, cold water is delivered to the cold water basin through a cold water conduit connected with a supply of cold water under pressure. The cold water conduit has a flow control valve and a timer-controlled solenoid valve whereby a predetermined volume of cold water may be repetitively delivered on each actuation of the timer. The discharge end of the cold water conduit is pointed downwardly directly into the drain opening in the basin and upper end of the cold water tube. In normal operation, there is no accumulation of cold water in the cold water basin. The discharge end of the cold water conduit is spaced above the drain opening and upper end of the cold water tube so as to provide an air gap between the discharge end and the drain opening and upper end of the cold water tube which prevents siphoning of water back through the cold water conduit.

5 Claims, 11 Drawing Figures

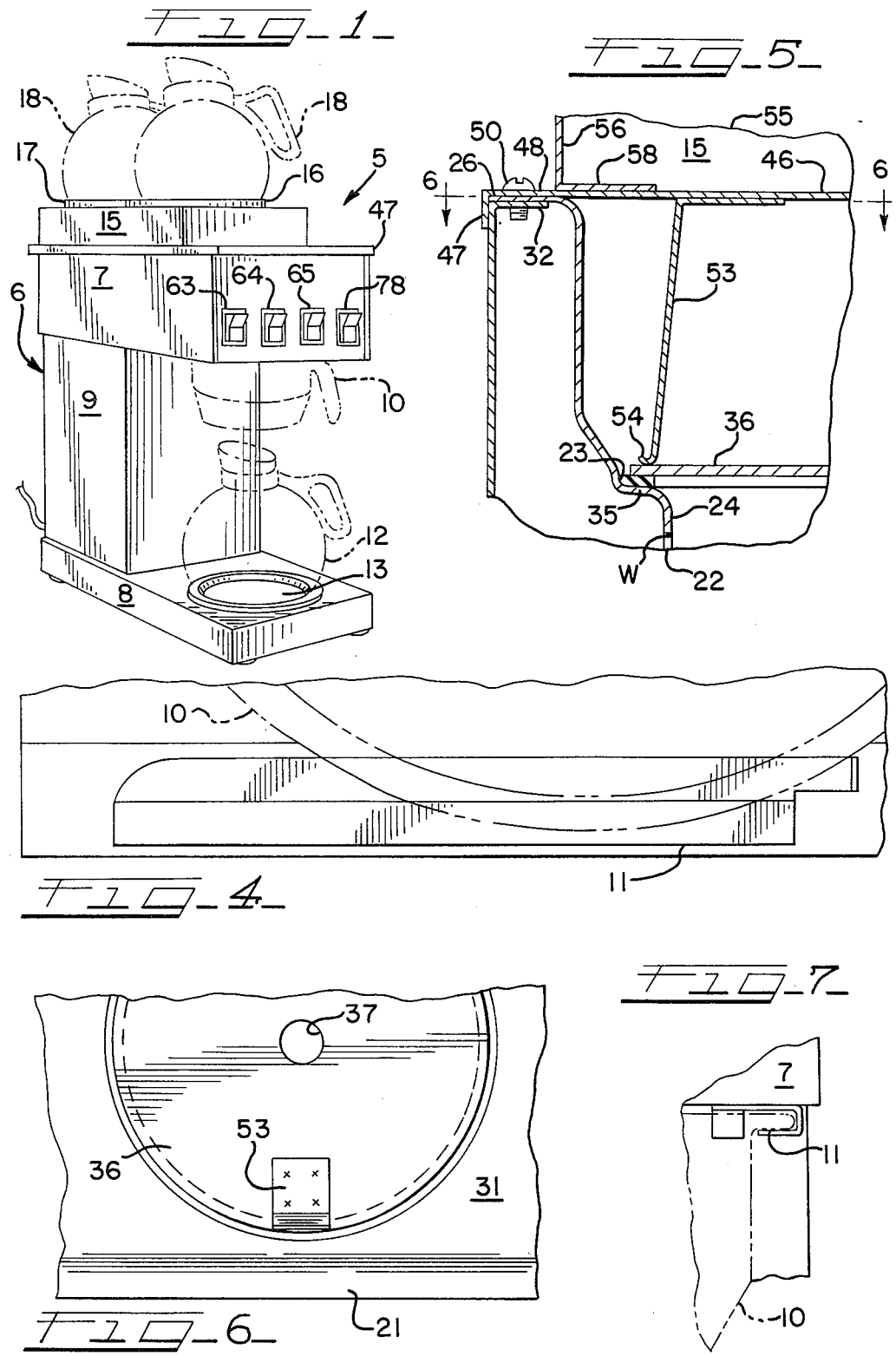

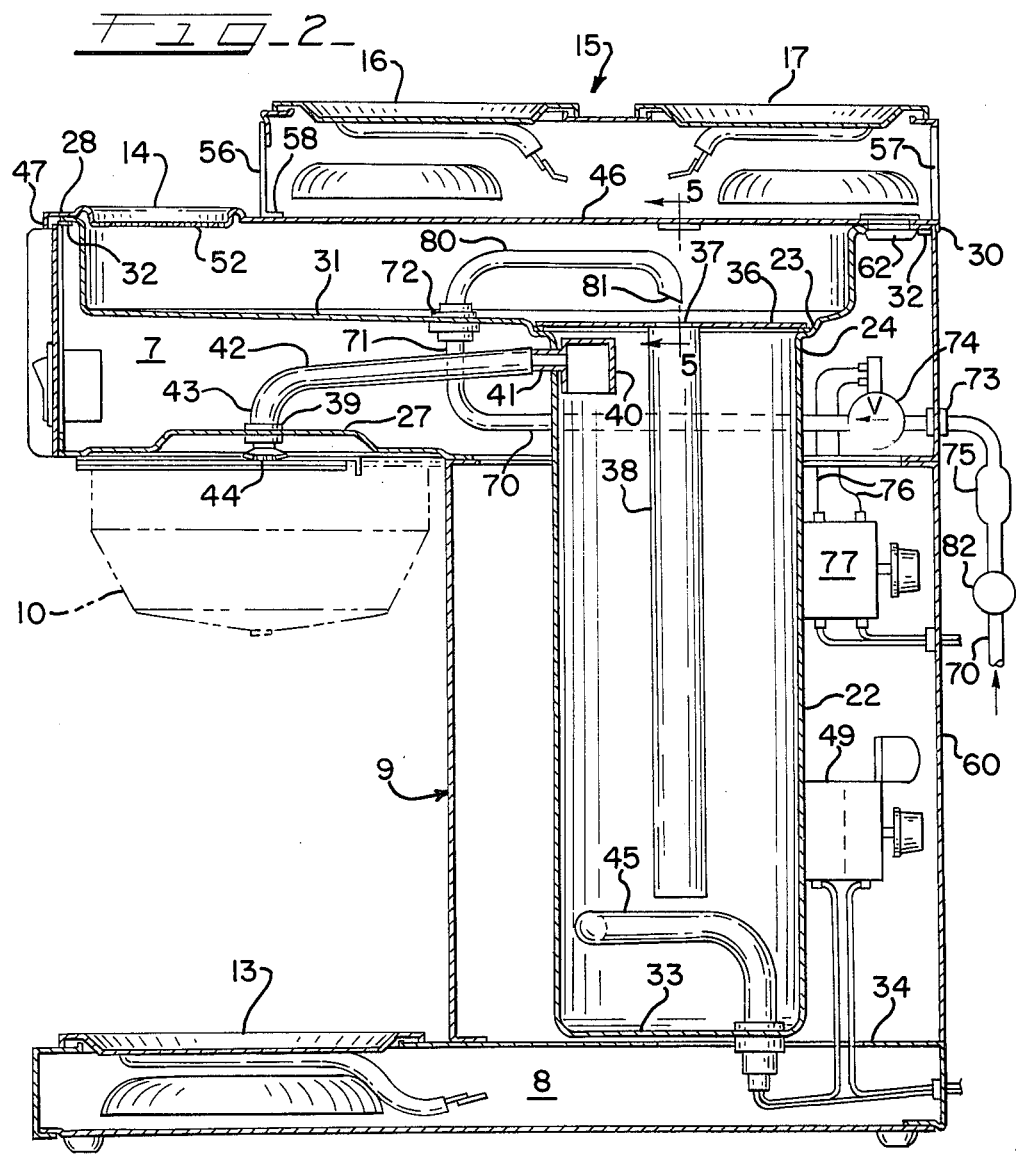
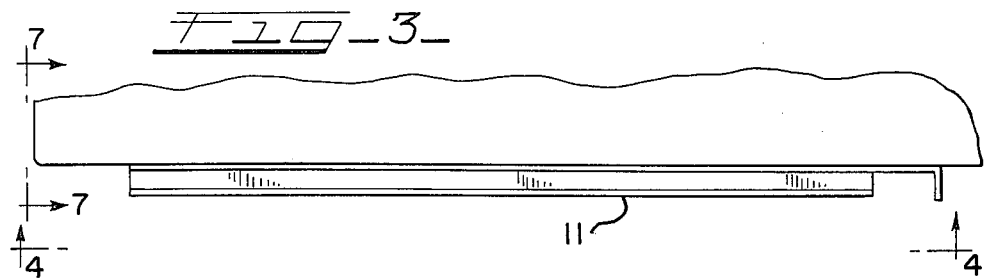

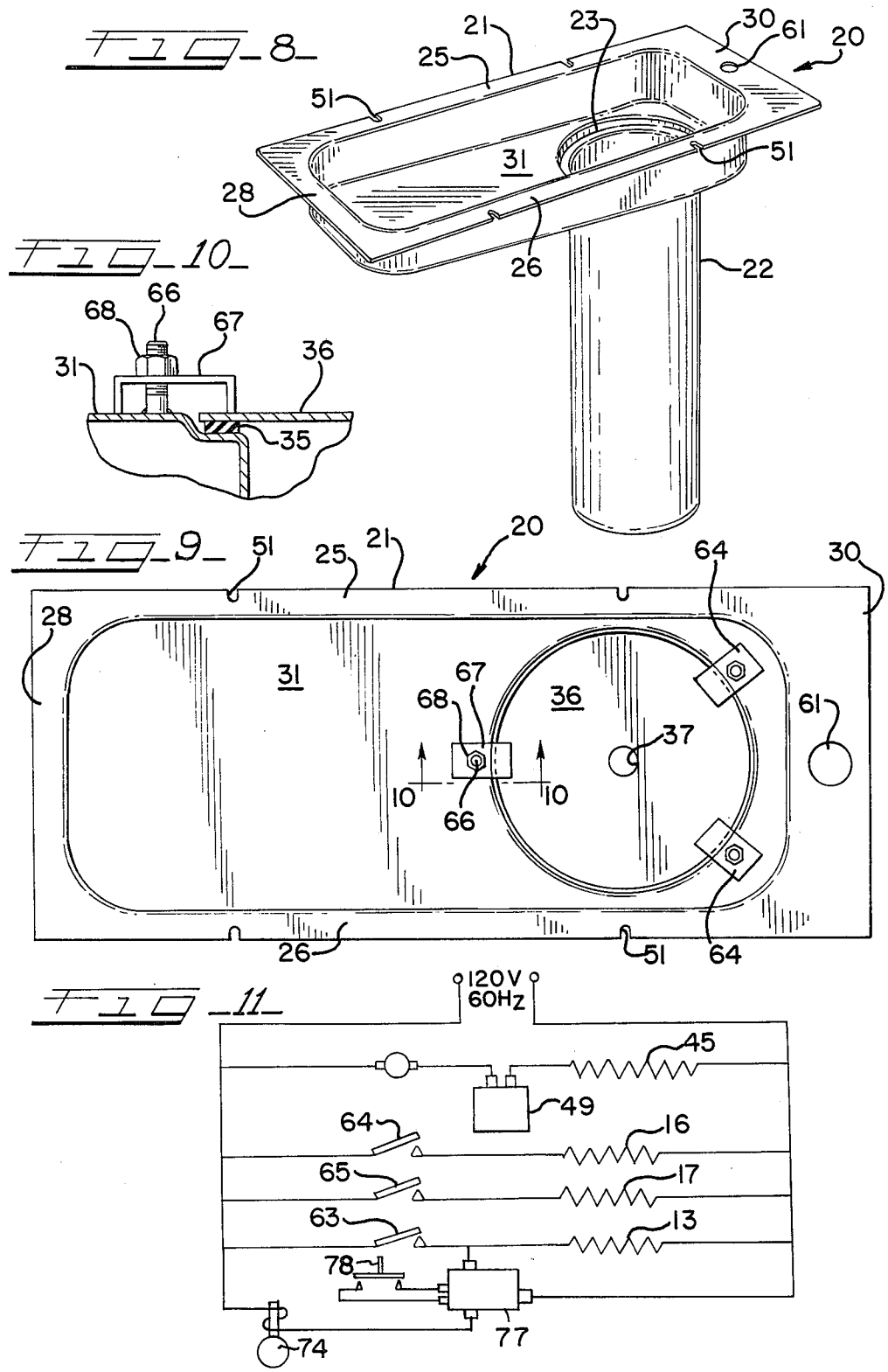

BEVERAGE MAKING MACHINE

This invention relates generally to innovations and improvements in beverage brewers of the type which include hot water tanks in which a supply of hot water is maintained at brewing temperature and in operation a batch of cold water is discharged adjacent the bottom of the hot water tank so as to displace hot water from the upper portion which overflows and discharges through a spray head onto a quantity of coffee or tea supported on a filter within a brewing funnel.

More particularly, the invention relates to innovations and improvements in such a beverage brewer which is intended to operate automatically on activation of suitable electrical controls including a timer to cause a predetermined volume of cold water to be delivered to the cold water basin of the appliance for displacement of the hot water from a hot water tank but which, when the automatic operation is interrupted for some reason, can be operated as a cold water pour-in beverage brewer by dumping batches of cold water into the cold water basin from which the water drains into the hot water tank.

Beverage brewers of the type having a hot water tank in which a supply of hot water is maintained for displacement by cold water and which are designed for automatic operation are well-known and have been commercially available for a number of years. They are shown and described, for example, in the following patents: Bunn U.S. Pat. No. 3,100,434; Hausam U.S. Pat. No. 3,343,478; Martin U.S. Pat. No. 3,691,933; Martin U.S. Pat. No. 3,793,934; Martin U.S. Pat. No. 4,094,233 and Bunn U.S. Pat. No. Re. 25,663. Cold water pour-in or pour-over beverage makers have also been known and commercially available for a number of years and are shown and described, for example, in the following patents: Martin U.S. Pat. No. 3,220,334; Lorang U.S. Pat. No. 3,354,810; Martin U.S. Pat. No. 3,450,024; Reynolds U.S. Pat. No. 3,479,949; Martin U.S. Pat. No. 3,494,276; Blumfield et al. U.S. Pat. No. 3,513,767; Martin U.S. Pat. No. 3,691,932; Martin U.S. Pat. No. 3,736,155 and Petrie U.S. Pat. No. 4,192,224.

As is well-known, beverage brewers of the automatic type are well-suited for use in restaurants, larger offices and other situations wherein there is a frequent need to produce multiple batches of coffee or tea in close succession and the convenience of being able to have the proper volume of cold water delivered automatically upon actuation of a control button or switch is an important consideration. On the other hand, the pour-in or pour-over type of beverage maker offers the advantages of not requiring any plumbing or being dependent on cold water being supplied automatically from a cold water system under pressure, such as municipal water system.

Normally, when a beverage maker appliance is plumbed or connected to a source of water under pressure, such as the water system of a building supplied with water from a municipal water system, it is a code requirement that provision be made so that, in the event of a failure of pressure in the system, there will be no siphoning or flow-back of water or liquid from the appliance into the supply system. This precautionary requirement prevents potential contamination of the system from any one of the numerous outlets or appliances to which it may be connected. By virtue of the present invention, it is now possible to incorporate, at little or no cost, a feature into beverage brewers embodying this invention which eliminates the need for the usual anti-siphoning or flow-back preventing devices.

In view of the foregoing, it will be seen that an important object of the present invention is the provision of improvements in beverage makers or brewers of the hot water displacement type wherein the cold water used to displace the hot water can be supplied either automatically from a pressure source or manually poured or dumped into the appliance whereby the appliance of beverage maker is capable of both types of operation.

An important object of the invention is provision of a beverage making appliance or beverage brewer of the hot water displacement type which incorporates at no additional cost a feature which prevents water or liquid from the appliance or brewer being siphoned or flowing back into the supply system when the appliance is operated automatically.

Another important object of the invention is the provision of a beverage maker operable either automatically or as a pour-in and which has a cold water basin to which batches of water are delivered either under timer control or poured in manually, and from which basin the water commences to drain immediately into the hot water tank.

Certain other objects and advantages of the invention will become apparent from the following detailed description of a preferred embodiment of the invention taken in connection with the accompanying drawings therein:

FIG. 1 is a perspective view of a coffee brewer forming one embodiment of the present invention which is capable of either automatic or pour-in operation, and wherein three coffee beakers or carafes are shown in broken outline along with a removable brewer funnel;

FIG. 2 is a longitudinal vertical sectional view of the brewer shown in FIG. 1, certain parts being shown in elevation.

FIG. 3 is a fragmentary side elevational detail view on enlarged scale showing the inside of one of the guide rails for the removable brewer funnel;

FIG. 4 is a fragmentary detail bottom plan view of the guide rail construction shown in FIG. 3;

FIG. 5 is an enlarged fragmentary detail sectional view taken on line 5—5 of FIG. 2.

FIG. 6 is a fragmentary top plan view taken on line 6—6 of FIG. 5;

FIG. 7 is a fragmentary detail view taken on line 7—7 of FIG. 3;

FIG. 8 is a perspective view of the integral, inverted L-shaped, combination elongated shallow cold water basin and relatively deep hot water tank housed in the brewer shown in FIGS. 1 and 2;

FIG. 9 is a top plan view of the integral cold water basin-hot water tank shown in FIG. 8 with the addition of a lid disc in place over the hot water tank and held down by three clamps;

FIG. 10 is a detail sectional view on line 10—10 of FIG. 9;

FIG. 11 is a simplified circuit diagram for the brewer of FIGS. 1–10.

Except for certain additions incorporated into the appliance shown in FIGS. 1–10 which will be noted below, the coffee brewer shown therein corresponds to the pour-in coffee brewer shown and described in application Ser. No. 334,579 filed Dec. 28, 1981 by Donald L. Daugherty and assigned to the assignee of this application.

Referring to FIG. 1, a coffee brewer is indicated generally at 5 which has a generally C-shaped body 6 which includes an upper leg portion 7, a lower leg portion 8, and an interconnecting upright leg portion 9. The brewer body 6 is fabricated in known manner, desirably from stainless steel sheet, but it may be fabricated from other metals or from known plastics having suitable strength and durability. A brewer funnel of known type indicated at 10 is removably supported in known manner by guide rails 11—11 underneath the upper leg portion 7. A coffee beaker or carafe 12 is removably supported on the leg 8 underneath the funnel 10 on a heated warming plate or disc 13 mounted on the lower leg portion 8.

A cold water, pour-in opening 14 (FIG. 2) is located on the top front of the upper leg portion 7. Rearwardly thereof, a top warmer unit 15 is mounted which includes a pair of warming plates 16 and 17 on which two additional beakers or carafes 18 may be mounted.

The C-shaped brewer body 6 houses an integral, inverted L-shaped, combination elongated cold water basin and relatively deep hot water tank indicated generally at 20 in FIGS. 8 and 9. The elongated cold water basin 21 is desirably die-pressed in known manner from stainless steel sheet and the relatively deep hot water tank 22 is welded to a bottom opening formed adjacent the deep end of the basin 21. The opening in the bottom of the basin 21 is formed in such a manner as to have a circumferential depression or recess 23 (FIGS. 2 and 8) with a circumferential collar 24 (FIG. 5) integrally formed on the bottom of the depression 23. The upper circumferential edge of the deep tank 22 is welded (W FIG. 5) to the bottom edge of the collar 24 so as to make the basin and tank 22 an integral inverted L-shaped receptacle or container. The tank 22 is preferably fabricated from stainless steel sheet in known manner.

The upper edge of the shallow cold water pan or basin 21 is provided with a continuous out-turned, horizontal flange comprising side portions 25 and 26 and end portions 28 and 30.

It will be seen from FIG. 2 that the bottom 31 of the basin 21 slopes toward the bottom recess 23 so that cold water poured into the basin 21 will flow and drain into the tank 22.

The manner in which the unit 20 is mounted and supported within the housing or body 6 of the brewer is shown in FIGS. 2 and 5. Referring to FIG. 2, it will be noted that the upper leg portion 7 of the body 6 has an in-turned horizontal flange 32 formed around the upper edge thereof. The out-turned flange on the upper edge of the basin 21 is dimensioned so as to fit over and rest flatwise upon the in-turned flange 32.

The height of the deep tank 22 is so dimensioned that the bottom 33 thereof is spaced at least slightly above the top wall 34 of the lower leg portion 8 so that the lateral flange on the basin 21 will rest on the in-turned flange 32.

In a brewer 5 capable of making two-quart batches of coffee, the tank 22 can have, by way of illustrative example, an inside diameter of 5 inches and a depth of 14 inches giving it a capacity of 275 cubic inches (i.e. slightly over two fluid quarts). The capacity of the shallow basin 24 suitable for a hot water tank 22 of such capacity is 155 cubic inches with the interior of the basin having a length of 15¼ inches, a width of 6¼ inches and a depth ranging from 1¾ to 1½ inches.

The circular opening communicating between the bottom 31 of the basin 21 and the top of the tank 22 is closed by a disc or baffle 36 which rests on a ring gasket 35 (FIG. 5) seated in the recess 23. A central drain opening 37 is provided in the disc 36 which communicates with the upper end of a vertical cold water tube 38 (FIG. 2), the upper end of which is welded or otherwise suitably joined to the underside of the disc 36. The bottom end of the cold water tube 38 terminates adjacent the bottom 33 of the tank 22 so that as cold water flows downwardly through the tube 38, it is discharged into the lower portion of the tank 22 and thereby displaces upwardly the hot water contents in the tank 22. This manner of operation is well-known in connection with brewers of the hot water displacement type wherein batches of cold water displace hot water from a hot water tank.

An inverted siphon cup 40 is positioned adjacent the top of the tank 22 and the side thereof facing the removable brewer funnel 10. The cup 40 is carried by the inner end of a nipple 41 which projects in fluid-tight relationship through a suitable opening in the wall of the tank 22. The outer end of the nipple 41 connects with a downwardly slanted tube 42 having a down-turned outer or distal end 43 on the lower end of which a hot water spray head 44 is fastened in known manner. The end 43 passes through the spray head panel 27 and secured thereto by a two-part fastener 39 of known type.

Water within the tank 22 is heated in known manner by a heating element 45 that may take the form of a Calrod element or other known electrically energized heating element.

The top of the basin 21 is covered and enclosed by a cover member 46 which forms the top of the upper portion 7 of the C-shaped body 6. This cover 46 is formed with a downwardly extending flange 47 so as to fit over the upper edge of the vertical side walls forming the upper leg portion 7. The inner-fitting relationship between the in-turned flange 32 on the vertical sidewalls of the upper leg portion 7, the out-turned flange on the cold water basin 21 (25,26,28 and 30) and the outer margin 48 and down-turned flange 47 on the cover 46 is well-shown in FIG. 5. This inter-fitting relationship of flange members forms a compact sandwich and peripheral top seal which may be readily secured together by a plurality of screws, one of which is indicated at 50 in FIG. 5. Usually four such screws will be adequate and notches 51—51 are preferably provided therefor in the flanges 25 and 26 as shown in FIG. 8.

The cold water, pour-in opening 14 is formed in the cover 46 adjacent the front of the brewer 5 and preferably is provided with a screen 52 (FIG. 2) so as to prevent foreign objects from entering the enclosed basin 21. A cover of known type (not shown) may be provided for the screened opening 14.

The cover 46 completely encloses the cold water basin 21 and serves as a floor support for the upper and top heater unit 15.

The vertical sidewalls 55—55, and front and rear end walls 56 and 57, of the heater unit 15, are preferably provided with in-turned flanges such as flange 58 on the front end wall 56 whereby these in-turned flanges support the heater unit on the top of the cover 46. The warmer units 16 and 17 are mounted in a top wall of the heater unit 15 in known manner.

Preferably, the rear wall 57 of the heater unit 15 is made so as to be a removable panel, and likewise, the rear wall 60 of the vertical leg portion 9 is preferably made as a removable panel, whereby convenient access may readily be had to the interiors of the heater unit 15 and of the body 6 for such servicing as may be required.

It will be understood that suitable electrical wiring and controls, including a thermostatic control 49 for the heater element 45, will be provided, the same being illustrated in FIG. 11. The electrical conductors leading to the top warmers 16 and 17 are arranged to pass through an opening in the cover 46 which registers with an aperture 61 (FIG. 8) in the flange 30 on a basin 21. These registering openings are preferably provided with a resilient grommet 62 (FIG. 2) and the conductors for the heaters 16 and 17 can pass through this grommet.

Suitable electrical switches for controlling the bottom warmer 13 and the top warmers 16 and 17 are indicated at 63, 64 and 65, respectively, in FIG. 1.

Operation of the brewer 5 in the cold water pour-in mode will be readily understood since it generally parallels the operation of known cold water, pour-in type beverage brewers. In putting brewer 5 into operation, sufficient cold water is dumped into the basin 21 so as to completely fill the hot water tank 22. The fact that the tank is filled will be known when water commences to flow out through the side tube 42 and discharge from the spray head 44. When the hot water tank is thus filled, the heating element 45 may be energized and, thereafter, the warmers 13, 16 and 17 likewise energized as needed. Once the cold water contents of the tank 22 have had an opportunity to come to the desired elevated temperature, a filter with the proper amount of ground coffee may be placed in the brewer funnel 10 and inserted into place on the underside of the top leg portion 7 so as to be supported beneath the spray head 44 on the in-turned rails 11—11 mounted on the underside of the leg portion 7.

Assuming that a two-quart batch of coffee is to be brewed, a pitcher containing two quarts of cold water is rapidly dumped into the basin 21 through the opening 14. The cold water will immediately start to flow downwardly through the cold water tube 38 at a fast enough rate so that the basin 21 will not overflow even with fast dumping of the two quarts of cold water through the opening 14. The entrance of the cold water into the bottom of the hot water tank 22 is at such a rate that it does not mix to a substantial extent with the hot water therein, but rather, the in-coming cold water displaces the hot water upwardly so that it commences to flow out through the side tube 42. Once this flow has started, it will continue due to siphoning action until the water level in the tank 22 drops below and exposes the bottom of the inverted siphon cup 40. As is well-known, hot water sprays from the spray head 44 onto the ground coffee in the brewing funnel 10 and the coffee beverage forms in the funnel and discharges through the bottom opening of the funnel 10 into the carafe or beaker 12 setting on the warmer plate 13.

It will be seen that up to three batches or carafes of coffee may be prepared and maintained at one time on the brewer 5 by using the three warmers 13, 16 and 17.

It will also be seen that the interior of the hot water tank 22 can be readily reached for cleaning by simply removing the cover 46 and lifting the cover together with the heater unit 15 from the upper leg portion 7. Since periodic cleaning or servicing of the interior of the heater tank is normally required, this ready access is a highly desirable feature.

The inverted L-shaped configuration of the combination cold water basin 21 and deep hot water tank 22 allows the brewer 5 to have a relatively narrow profile from left to right so that it takes up only a small space from one side to the other on a counter top or table. Generally, counter space is at a premium and often limited or restricted. Accordingly, this narrow configuration is highly desirable.

In FIGS. 9 and 10, an alternate means for clamping the hot water tank lid 36 is shown which may be used in place of, or in conjunction with, the hold-down legs 53 (FIGS. 5 and 6). This alternate means comprises three upstanding studs 66—66 welded to the floor 31 of the cold water basin around the depression 23 therein. Inverted U-shaped clamp members 67 fit loosely over the threaded ends of the studs 66 and nuts 68—68 are provided for tightening down the clamps 67 on the top of the disc 36 thereby compressing the ring gasket 35 to the desired degree. It will be seen that by loosening the nuts 68 the clamps 67 may be rotated or removed so that the lid 36 may be lifted.

The coffee brewer 5 thus far shown and described in connection with FIGS. 1–10 corresponds to the same brewer previously shown and described in Ser. No. 334,579 filed Dec. 28, 1981 by Donald L. Daugherty and assigned to the assignee of this application. However, that prior brewer has been modified and equipped for automatic operation in accordance with my present invention by mounting in the upper leg portion 7 of the housing a cold water line or supply conduit 70 having a vertical leg 71 the upper end of which is clamped in watertight relationship to the lower end of a fitting 72 of known type mounted in the floor 31 of the cold water basin 21. The cold water line or conduit 70 extends through a support grommet 73 in the rear panel 60 and is exteriorly plumbed in suitable manner to a source of cold water under pressure such as the cold water service in a building served by a municipal water system. Preferably, the conduit 70 on the exterior of the appliance 5 has a manual shut-off valve 82 therein by which the appliance can be disconnected from its supply of water.

Disposed in the cold water inlet line 70 on the interior of the appliance is a solenoid actuated valve 74. Also disposed in the cold water line 70 on the exterior of the appliance 5, and downstream of the shut-off valve 82 a flow control valve 75 is disposed which automatically regulates the flows of cold water through conduit 70 at a predetermined value. The valves 74, 75 and 82 are of known commercial types. The solenoid actuated valve 74 is energized through conductors 76 connected in circuit relationship with an adjustable timer of known commercial type indicated at 77. The adjustable timer 77 is also connected in known manner to a start switch 78 mounted on the upper front panel of the coffee brewer as shown in FIG. 1.

The cold water inlet line 70 delivers cold water into a U-shaped tube or conduit 80 (FIG. 2) one downwardly turned leg of which is connected to the upper end of the coupling or fitting 72 with the opposite leg being of reduced length so as to have a discharge opening 81 centered directly over the outlet opening and drain hole 37. It is an important feature of the construction that the discharge opening 81 be both centered over the drain opening 37 and spaced a suitable distance thereabove (e.g. at least 1 inch). The purpose of this air gap or spacing between the opening 37 and the discharge opening 81 is to prevent contents of the appliance from siphoning back through the inlet line 70 in the event there should be a failure of pressure in the cold water supply system when valves 74 and 82 are open.

The purpose of having the discharge opening centered directly over the drain opening 37 is to prevent scale or solids from being deposited around the margin of the opening and upper end of the cold water tube 38.

FIG. 11 is an electrical circuit diagram of the wiring of the brewer 5 with energization from a 120 volt, 60 Hz current source.

In operation of the brewer 5 in the automatic mode, with the brewing funnel 10 being loaded with a fresh charge of coffee or tea in a filter and with a carafe 12 disposed on the bottom warmer 13 and the bottom warmer switch 63 on, the button of the switch 78 is pushed to its on position thereby causing the solenoid actuated valve 74 to be actuated to the open position for a predetermined time depending on the setting of the timer 77. During the time the valve 74 is open, cold water flows in through the cold water line 70 in a controlled manner as a result of the operation of the flow control valve 75, even though there is normally some fluctuation in the pressure. The rate of flow of the cold water and discharge thereof from the opening 81 is such that flow of hot water displaced from the upper portion of the hot water tank 22 and discharged through the spray head 44 can take place at the same rate, thereby preventing any accumulation of cold water underneath the discharge opening 81. For example, in the case of a two-quart capacity coffee brewer 5, the cold water can flow through the inlet line 70 at the rate of 0.195 gallon per minute while the displaced hot water discharges from the spray head 44 at the same rate.

In the event of some malfunction which interrupts the normal operation of the coffee brewer 5 in the automatic mode, the supply of cold water will be shut off manually by operation of the shut-off valve 82 in the cold water supply line. With the supply of cold water turned off, it will be seen that the brewer 5 can be operated in the pour-in or pour-over mode by dumping the batches of cold water directly into the cold water basin.

What is claimed as new is:

1. Beverage brewing apparatus capable of operating either automatically or by cold water pour-in and comprising, in combination, a cold water basin provided with both a drain opening and a fill opening through which a batch of cold water may be poured or dumped, a cold water inlet line for supplying cold water to said basin from a pressurized water supply, valve means in said cold water inlet line for opening and closing said line, means for opening and closing said valve means to either allow cold water to flow through said cold water inlet line and into said basin or prevent cold water from flowing through said line, timer means operatively associated with said valve means for closing said valve means a predetermined time interval after each opening thereof thereby allowing a predetermined quantity of cold water to flow to said basin each time said valve means is opened, a hot water tank under said basin, means for heating water in said tank, a cold water tube having its upper inlet end connected to said drain opening and having its lower outlet end disposed in the lower portion of said hot water tank whereby cold water in said basin empties by gravity into the lower portion of said hot water tank, a hot water spray head, a siphon tube interconnecting said spray head with a hot water outlet opening adjacent the top of said hot water tank whereby hot water displaced by cold water entering the lower portion of said tank flows through said siphon tube to said spray head through which it discharges, and means for supporting a brewing funnel beneath said spray head.

2. Beverage brewing apparatus capable of operating either automatically or by cold water pour-in and comprising, in combination, a cold water basin provided with both a drain opening and a fill opening through which a batch of cold water may be poured or dumped, a cold water inlet line for supplying cold water to said basin from a pressurized water supply and having a discharge opening which is directed downward and centered over said drain opening, valve means in said cold water inlet line for opening and closing said line, means for opening and closing said valve means to either allow cold water to flow through said cold water inlet line and into said basin or prevent cold water from flowing through said line, timer means operatively associated with said valve means for closing said valve means a predetermined time interval after each opening thereof thereby allowing a predetermined quantity of cold water to flow to said basin each time said valve means is opened, a hot water tank under said basin, means for heating water in said tank, a cold water tube having its upper inlet end connected to said drain opening and having its lower outlet end disposed in the lower portion of said hot water tank whereby cold water in said basin empties by gravity into the lower portion of said hot water tank, a hot water spray head, a siphon tube interconnecting said spray head with a hot water outlet opening adjacent the top of said hot water tank whereby hot water displaced by cold water entering the lower portion of said tank flows through said siphon tube to said spray head through which it discharges, and means for supporting a brewing funnel beneath said spray head.

3. Beverage making apparatus as called for in claim 2 wherein, flow control valve means is located in said cold water inlet line and restricts cold water flow therethrough from exceeding the rate at which hot water is displaced from said hot water tank.

4. Beverage making apparatus as called for in claim 3 wherein said discharge opening of said cold water inlet line is spaced above said drain opening so as to provide an air gap therebetween which prevents siphoning through said cold water inlet line if there is a loss of pressure therein.

5. Beverage making apparatus as called for in claim 2 wherein, said valve means for opening and closing said cold water line is a solenoid actuated valve and said timer means is connected in electrical control circuit relationship with said solenoid actuated valve.

* * * * *